United States Patent [19]

Schmelow et al.

[11] 4,101,092
[45] Jul. 18, 1978

[54] UNIVERSAL EMERGENCY LOCKING RETRACTOR

[75] Inventors: Harald Martin Schmelow, Ellerau/Krs. Segeberg; Per Olof Weman, Hasloh; Heino Arff, Henstedt-Ulzburg, all of Fed. Rep. of Germany

[73] Assignee: N.V. Klippan S.A., Haasrode, Belgium; a part interest

[21] Appl. No.: 675,406

[22] Filed: Apr. 9, 1976

[51] Int. Cl.² .................. B65H 75/48; A62B 35/02
[52] U.S. Cl. .................. 242/107.4 B; 242/107.4 A
[58] Field of Search .............. 242/107.4 R–107.4 E; 297/388; 280/744–747

[56] References Cited

U.S. PATENT DOCUMENTS

| | | | |
|---|---|---|---|
| 2,953,315 | 9/1960 | Lautier et al. | 242/107.4 B |
| 3,416,747 | 12/1968 | Stoffel | 242/107.4 B |
| 3,711,037 | 1/1973 | Jakob | 242/107.4 B |
| 3,907,227 | 9/1975 | Takada | 242/107.4 B |
| 3,955,744 | 5/1976 | Weman | 242/107.4 B |

*Primary Examiner*—Harvey C. Hornsby
*Assistant Examiner*—John M. Jillions
*Attorney, Agent, or Firm*—Patrick L. Henry; Ernest D. Buff

[57] ABSTRACT

A seat belt retractor of the inertia type comprises a rotatable shaft with a cam-surface driven thereby. A locking element movable on the cam surface is positively displaced by a control element fitted in a recess thereof and acting from an inertia element. The locking element, when driven by the inertia member, engages with the teeth on an annular locking ring to stop retraction of the seat belt attached to the shaft. The inertia element may be spring preloaded and a locking wheel may be provided to provide alternative locking torque for the inertia element when the car assumes a roll-over condition in which the seat belt would not ordinarily retract quickly.

8 Claims, 12 Drawing Figures

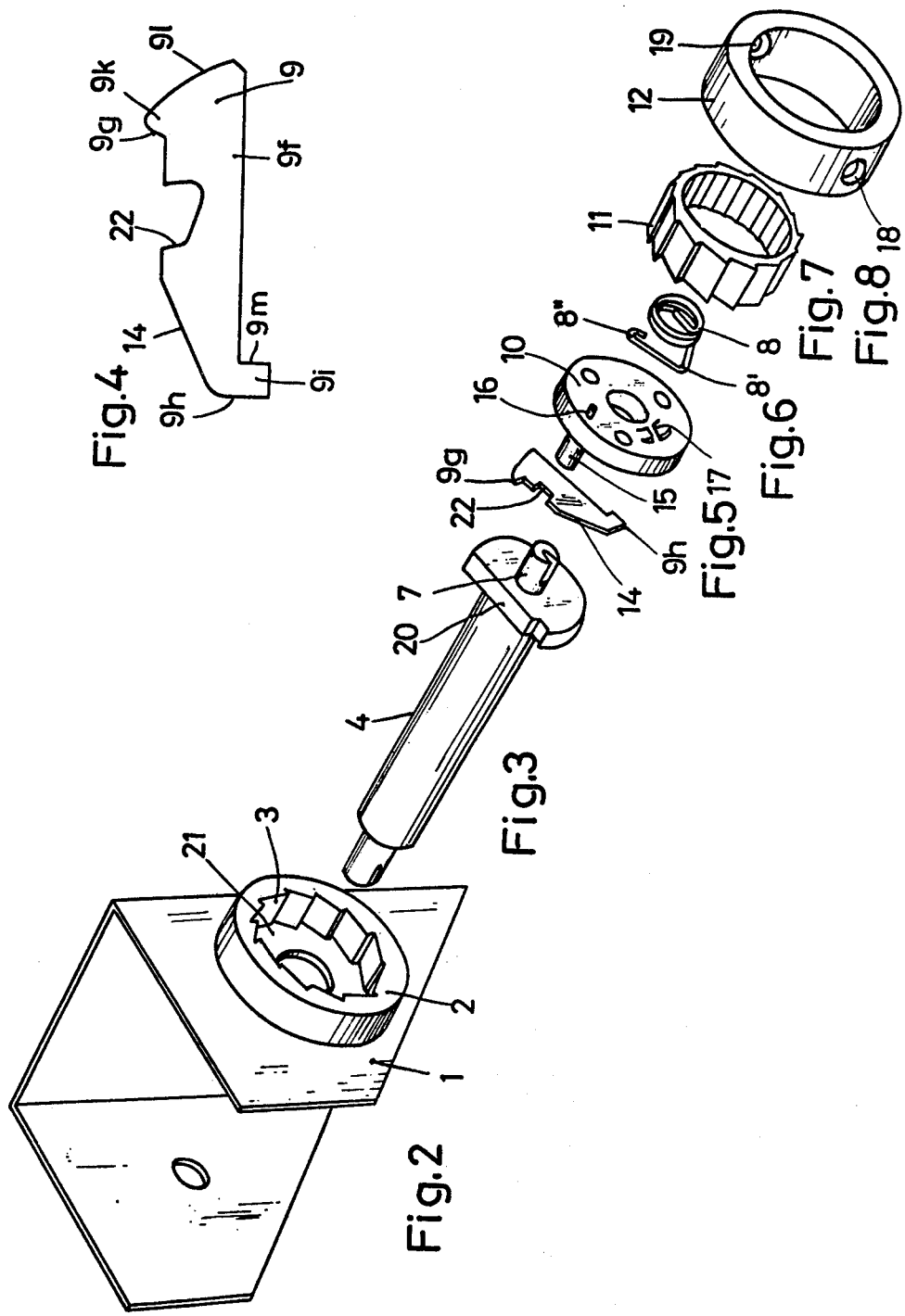

UNIVERSAL EMERGENCY LOCKING RETRACTOR

The invention relates to an inertia type belt-retractor for vehicle safety belts.

In the case of known belt-retractors of the inertia type, the end of the seat belt extending out of the retractor is wound onto a rotatable shaft. With this type of belt-retractor excessive acceleration cannot be used when the occupant wishes to pull out and use the belt. When the belt is in position on the occupant, the retractor applies tension in order to ensure that the belt lies snugly against the occupant's person. This tension may be applied, for example, by means of a spiral spring which pre-loads the shaft onto which the belt is wound in the direction of belt retraction. When the belt is released, it immediately winds back into the retractor. Accordingly, buckling-up is facilitated and the occupant has freedom of movement when the belt is fitted. It is essential, however, that the shaft of the retractor be locked in case of an accident so that the belt cannot be pulled out.

Some known locking means for seat belts are governed by the deceleration of the vehicle. When the vehicle is suddenly decelerated, a sensing means such as a pendulum, ball, or other inertia element, is displaced and locks the shaft by a locking wheel. In another known design, the locking of the retractor shaft is governed by the peripheral velocity of the shaft when the belt is extended, such as, for example, by centrifugal force. A further proposal has been made to make the locking of the shaft dependent only upon the acceleration of the belt, so that the locking effect is produced only in the event of an accident, when the belt is jerked out. In this proposal, as long as a preadjustable angular acceleration is not exceeded, the belt may be extended at any desired velocity without producing a locking effect. Since safety-belt standards define a specific acceleration of the belt as the mandatory minimum locking magnitude, a rotating sensor must be utilized to react to angular acceleration.

One embodiment resulting in the advantages heretofore described has an inertia element in the form of a ring with two diametrically opposed pins on the end face and means for engaging a spring arranged in a cylindrical part secured to the shaft. The spring is coupled to the shaft and the locking means, which also comprises an engagement edge for the pins on the inertia element, is arranged between the inertia element and the shaft. In the manner of a flywheel, the inertia element has the same angular velocity as the shaft when the belt is pulled slowly out of the retractor, the shaft being the one to which the end of the belt is secured to and onto which the belt is wound. A locking element is mounted on each of the two pins on the shaft in such a manner that, when the belt is extended at a velocity below a minimum amount the locking elements do not rotate about the pins but assume the angular velocity of the shaft while remaining stationary relative thereto, and also relative to the position of the inertia element. As long as a specific, predetermined, angular velocity is not exceeded, the angular velocity may assume increasingly high values without producing a locking effect.

In the event of an accident, however, the belt is jerked out at a much higher velocity and the shaft is immediately locked in order to retain the occupant. The inertia element is responsible for this immediate locking because its velocity fails to follow the sudden increase in the angular velocity of the shaft, i.e. the increase in angular acceleration. Thus, there is relative movement between the inertia element and the shaft which causes the locking elements mounted on the shaft to rotate.

In known designs responding to centrifugal force and angular acceleration, the external curved surfaces of the locking elements are provided with teeth which face a locking ring. These teeth on the locking ring do not extend radially outwardly a great distance and the locking ring is arranged coaxially with the shaft. In the peripheral direction, however, the teeth on the locking elements extend considerably farther, perhaps as much as four to six times. In the engaged position, locking is effected such that the short radial surfaces enter into engagement with the radial projections on the locking elements. The radial surfaces of the teeth on the locking ring are the actual lock-stops.

Whereas locking may be accomplished over the entire internal periphery of the locking ring by means of the teeth thereon, the locking elements have teeth only at the front end of the outer surface of curvature and, in fact, known locking elements are designed with one tooth only. In order to ensure engagement of the lock-stops with the teeth of the locking elements, on the one hand, and with the teeth of the locking ring on the other hand, they must be designed so as to allow engaging motion, i.e. the teeth of the locking elements are arranged forwardly of the teeth on the locking ring in the direction of shaft rotation.

As soon as the necessary deceleration force causes the locking elements to move out of their normal, unlocked position, the forwardly arranged teeth rotate along an arc about the pin upon which each locking element is pivotably mounted. Unfortunately, only a short time is available to bring the teeth into engagement i.e. to actually to cause the lock-stops to engage with the teeth of the locking element.

Both the known seat belt-retractors and the earlier proposal stated above have been found to possess the following two disadvantages.

1. When, just prior to tooth engagement, the tips of the teeth are opposite to each other, the lock stop on the tooth of the locking element does not have enough time to drop entirely into the opposing tooth in the locking ring. Thus the two lock-stops, although being designed to fully engage with each other, do not do so and engage only in the immediate vicinity of their tips. These small areas, however, are not strong enough to stop the rotating shaft or the locking element from rotating past the toothed locking ring. The tips of the teeth of the weaker part may be sheared off and, in fact, tests have shown that the tips of all of the teeth on the locking ring have been so sheared off. The retractor obviously no longer locks the belt and will be unserviceable in the event of an accident.

2. Again, when just prior to tooth engagement, the tips of the teeth lie opposite to each other, the tooth on the locking elements, instead of being sheared off, may jump. There is not enough time, in this case, for the two lock-stops to fully engage with each other by rotating the locking element outwardly at a sufficiently high speed. Only the tips of the teeth come into contact, and the teeth on the locking elements may jump from one tooth to the next on the locking ring, without producing the necessary locking effect.

The invention, therefore, seeks to improve the inertia-type seat belt retractor by ensuring that the belt is securely locked, regardless of the relative positions at any time of the two engaging teeth, by removing the danger of the teeth tips being sheared off or jumping on one another.

The present invention, therefore, is a retractor for safety belts, having a rotatable shaft for retracting the extensible belt, an inertia element rotatably mounted on said shaft, and a locking element adapted to move in a plane perpendicular to the axis of said shaft, said locking element moving relative to said shaft under the influence of said inertia element when a specific angular acceleration of said shaft is exceeded into locking engagement with a locking ring having internal teeth and being fixed relative to the housing of said retractor, said locking element comprising an internal cam-follower surface arranged opposite a cam surface driven by said shaft, and a radially fixed control element adapted to rotate about the axis of said shaft in engagement with said locking element, whereby movement of said locking element in a direction opposite to the direction of rotation of said shaft is possible before fully locked engagement of said locking element and said locking ring is reached.

By moving the locking element in a direction opposite to the direction of rotation of the shaft, the tip of the locking element has sufficient time to penetrate to the base of the opposing tooth on the locking ring and to bear against the opposing lock-stop. Tests have shown that a single tooth on the locking element will ensure proper locking reliably. It is particularly desirable to arrange the projection with the lock-stop on the rear side, as seen in the direction of rotation of the locking element.

The ability of the locking element to move in a direction opposite to the direction of rotation of the shaft is achieved by a form of cam control in which the cam-surface is on the rotating shaft and the cam-follower surface is on the locking element. A control element is provided which is adapted to rotate about the axis of the shaft, the control element holding the locking element through a recess, at a constant distance from the axis of the shaft. When the control element, the recess, and the locking element are caused — by any type of release mechanism — to rotate in relation to the shaft, the tooth at the rear of the locking element controlled by the cam-surface on the shaft, will engage with an opposing tooth on the locking ring.

The intitial and the smallest contact between the teeth on the locking ring and the tips of the teeth on the locking element cause the locking element to move in the direction of locking. The impulse of the control element is augmented by the friction occurring between the teeth at initial contact which improves the locking action. Furthermore, at the time of initial contact, the locking element cannot bounce back because it is guided by the control element.

This ensures that the locking element will be in a position to move in a direction opposite to the direction of rotation of the shaft before reaching the locking position.

In a preferred embodiment, the cam-follower surface and the cam-surface are substantially linear and follow a chord of a partially circular disc fitted to the shaft.

The cam-follower surface and cam surface may take different forms such as half moons. The configuration chosen, however, must ensure the toooth on the locking element will move into deeper engagement with the tooth on the locking ring upon initial contact.

Although the "anti-cyclic" movement of the locking element may also be achieved with differently shaped cam and cam-follower surfaces, and also without the partly circular disc fitted to the shaft, the abovementioned arrangement allows an exceptionally reliable belt-retractor.

Since counter-rotation of the locking element and shaft is impossible in known devices the tip of the tooth on the locking element is obliged to engage with the opposing tooth on the locking ring as soon as the locking element folded out. The present invention allows the shaft to continue to rotate, although not the locking element itself. The tip of the tooth on the locking element bears for some time lightly against the opposing lock-stop in the tooth of the locking ring, and as the shaft rotates, the two lock-stops have enough time to bear against each other with their full surfaces.

It is preferred for the rotatable control element to comprise an inertia element having a projection for engagement in a recess in the locking element, the inertia element being pre-loaded in relation to the shaft. Since preference is given to the design of belt-retractor which responds to angular acceleration and not to centrifugal force, the belt-retractor according to the proposal earlier described was provided with an inertia element which rotated the locking element about its bearing pin. According to the present invention, the projection on the inertia element projects into the recess in the locking element, thereby providing the function of the retainer. When a predetermined angular acceleration of the inertia element in relation to the spring pre-loaded shaft, or to a partly circular disc fitted to the shaft is exceeded, the projection on the inertia element moves the locking element tangentially, along a chord, in a direction opposite to the direction of rotation of the shaft. Since, the inertia element lags behind the rotary motion of the shaft, this displacement automatically produces engagement of the teeth.

In a further preferred embodiment, the locking element has a lock-stop fitted to a projection on one end and a stationary stop cooperating with a supporting surface on the cam-surface at its opposite end. The lock-stop on the locking element assumes the actual arresting force and transfers, it, via the cam-surface on the partly circular disc, to the shaft. The stationary stop ensures that the locking element is set accurately in the unlocked or inoperative position in which the control element has displaced the locking element back into the inoperative position by means of the spring pre-load. Adequate play must remain so that the shaft, the partly circular disc, and the locking element associated therewith may rotate without any ratchet-like clatter which would be carried with contact. The stationary stop will preferably come to rest on the supporting surface by the side of the cam-surface on the partly circular disc.

In a further preferred embodiment, the stationary stop on the locking element is formed by the end of a projecting lug and also comprises an auxiliary stop located on the opposide side of the stationary stop. This ensures that the locking element cannot be moved too far along the chord in a direction opposite the direction of rotation of the shaft, thereby preventing jamming of the locking mechanism and allowing the relatively weak spring to return the locking element to the unlocked position whenever the load on the belt is relieved.

According to a further preferred embodiment, a locking surface is located adjacent said lock-stop, said locking surface and said lock stop defining substantially the same angle as that between the flanks of said internal teeth of said locking ring. During locking, after the projection on the locking element has engaged with the opposing tooth on the locking ring integral with the housing, the locking surfaces bear on the base of the tooth in the locking ring, thus preventing any further movement of the locking element as the shaft rotates. Any further rotation of the shaft is therefore prevented by the cam-follower surface on the locking element and the adjacent cam surface of the partly circular disc. At this time, the rear end of the locking element, with its projection, is seated in the locking ring in a manner such that the lock-stops are facing each other and the locking surface is resting snugly upon the base of the tooth integral with the housing.

In a further preferred embodiment, the recess in the locking element is located at the centre of gravity thereof. This has the advantage of rendering impossible any rotation of the locking element about the pin of the inertia element. The locking element is thus in equilibrium and balanced about the recess. Accordingly, the cam-control activity of the surfaces between the shaft, the partly circular disc, and the locking element are improved and facilitated, such that the lock-stop on the locking element is, in fact, tangentially displaceable, as desired, in a direction opposite to the direction of rotation of the shaft, shortly before reaching locked position. In order to eliminate unwanted friction between the circle-like surface within the locking ring and the locking element moving in this plane, a disc made of a synthetic material, e.g., of polytetrafluorethylene, may be inserted if desired.

In a further preferred embodiment, the inertia element is in the form of a flywheel, and between said inertia element and said locking element, a spring used to pre-load said inertia element has one resilient portion projecting from said flywheel and being in resilient engagement with teeth of a locking wheel. This arrangement is higly suitable for a form of execution in which the locking of the belt retractor is not dependent merely upon the angular acceleration of the shaft, i.e., upon extension of the belt by a jerk, but also upon excessive acceleration of the vehicle itself, due to a collision or to tilting during a roll-over, for example. In this case, the small inertia elements or sensors in the form of balls, cones, or the like, suggested in an earlier design, are provided for engagement with a locking wheel intended to release the lock. It is preferable to transfer the retaining force produced by the sensors in the arrested locking wheel after the collision, to the inertia element which engages the locking ring through the locking element. In order to ensure that the locking element can fully engage the locking ring at each setting of an adjusting cylinder, a slipping or torque clutch must be used. The locking wheel must be able to move to some extent in relation to the control element, which is preferably in the form of a flywheel, and the coupling force between the locking wheel and the flywheel must be large enough to allow the locking element to be moved in the direction of locking. This rigid connection between the coupling wheel and the locking element is eliminated and replaced by a coupling consisting of the resilient spring portion. The locking wheel has internal teeth which are carried along by the spring portion. This ensures that the inertia element will be carried along by the locking wheel up to a given torque value which is adjustable by means of the spring. Only if the inertia element or flywheel is suddenly stopped — by reason of the locking element being stopped — does the projecting spring portion move like a ratchet over the teeth in the locking wheel. Thus the sensor, which engages with additional teeth on the outside of the locking wheel cannot damage the locking wheel. It is preferably, therefore that the locking wheel is annular and is made of synthetic material with both internal and external teeth.

Due to the freely sliding moumting of the locking element, the design of the new belt-retractor is simple, rugged, and highly reliable in operation. Because of the simple cam surfaces used in the preferred example of embodiment, production costs are low.

The invention will now be described, by way of example only, with the use of drawings in which FIG. 1 is a sectional view through the belt-retractor with the locking element shown in engagement with the teeth on the locking ring;

FIG. 2 is a perspective view of the housing of the belt-retractor with the locking wheel;

FIG. 3 is a perspective view of the retractor shaft, with the partly circular disc attached thereto;

FIG. 4 is a view of the arrangement of the locking element;

FIG. 5 shows the inertia element,

FIG. 6 shows the pre-loading spring with the extending spring portion,

FIG. 7 shows the locking wheel;

FIG. 8 is a perspective view of the annular retainer;

Figure 1:
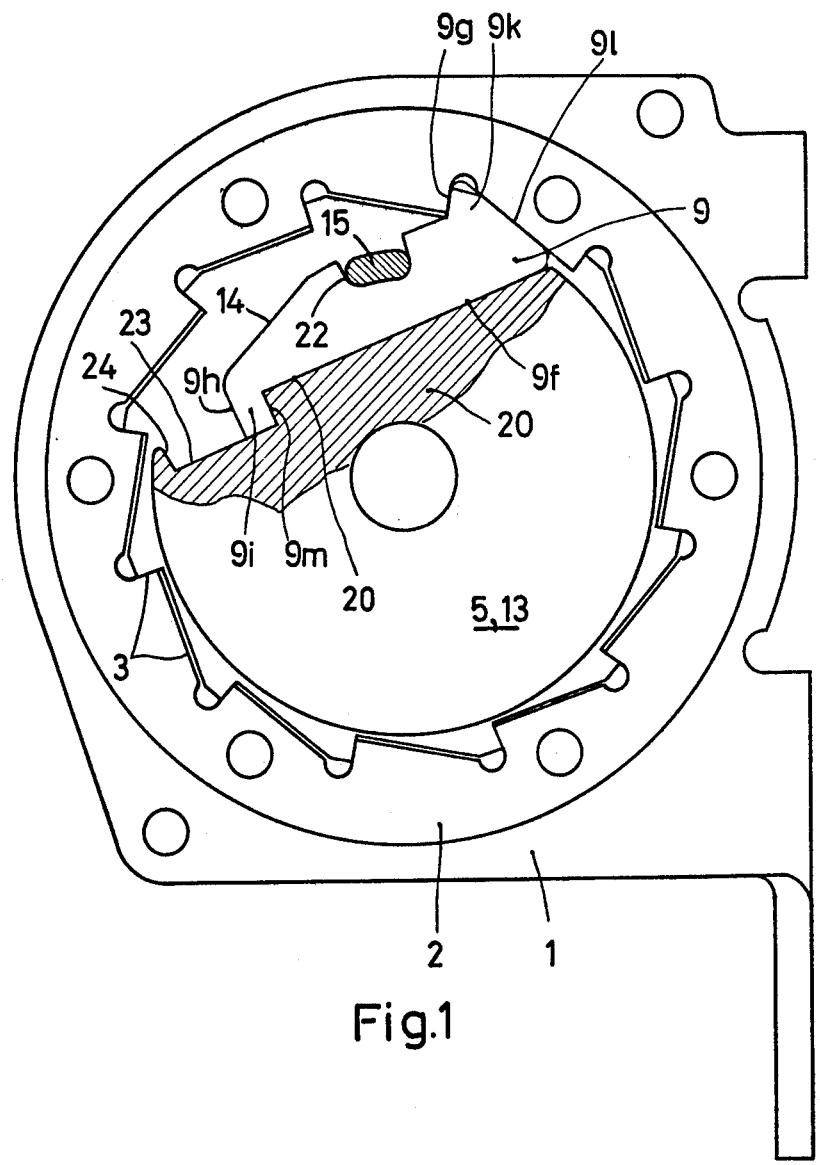
Figure 9:
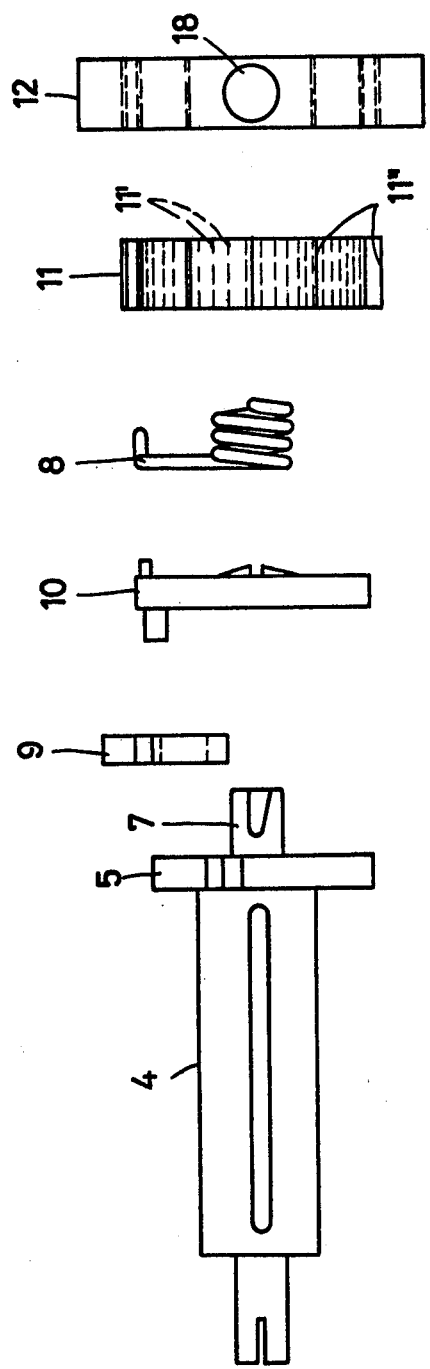
FIG. 9 is a side elevation of FIGS. 3 to 8, showing the shaft, the locking element, the inertia element, the spring, the locking wheel, and the annular retainer.
Figure 10:
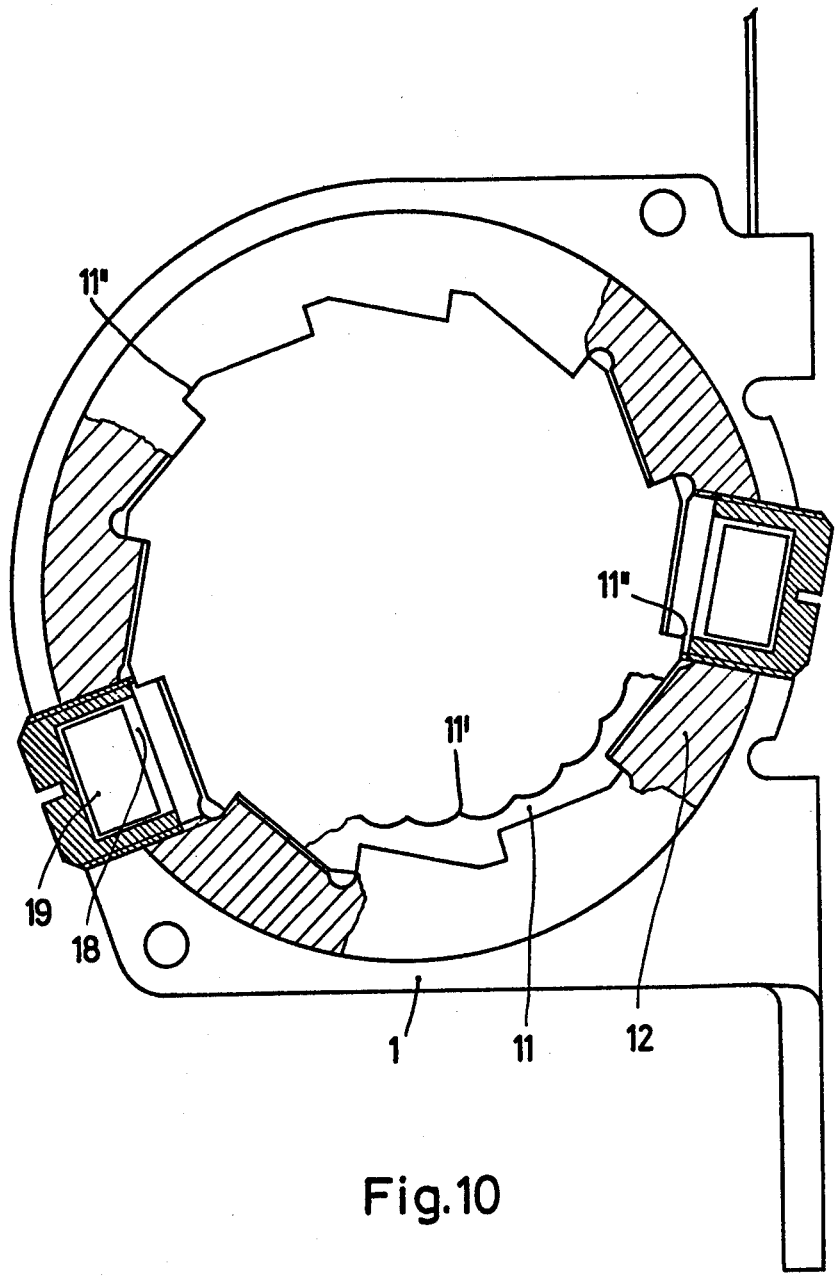
FIG. 10 is another sectional view of the belt-retractor as seen from the right-hand side of FIGS. 3 to 8 and 9.
Figure 11:
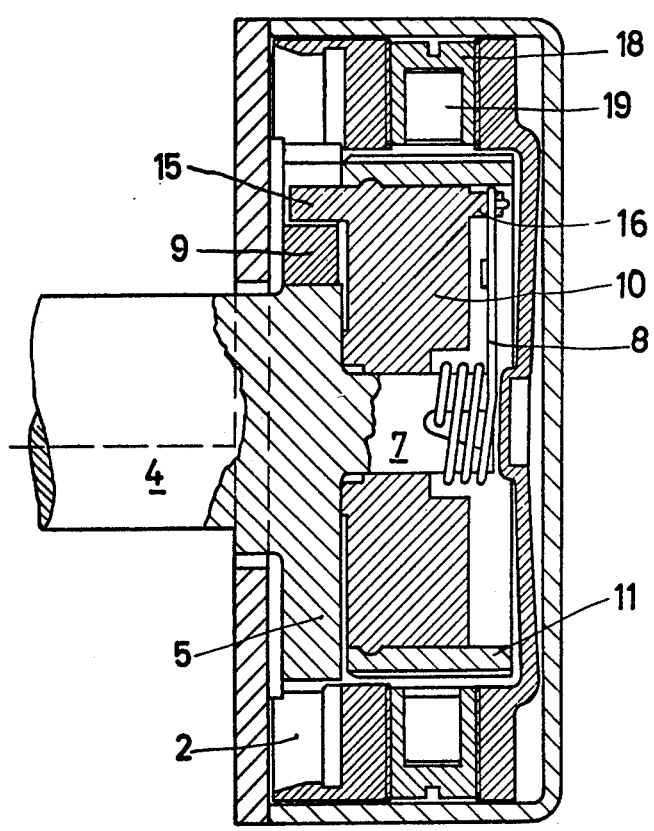
FIG. 11 is a section through the assembled locking mechanism.

As shown in FIG. 1 and FIG. 2, a locking ring 2 with internal teeth 3 is fitted to one side of the basic U-shaped frame 1 of the belt-retractor. The belt, retracting spring and other parts of the belt-retractor are not shown. Retractor shaft 4, with partly circular disc 5 fitted to the front end thereof, is inserted, along the longitudinal direction of the axis, into the recesses provided in the housing 1. Located in the centre of the front end-face of partly circular disc 5 is a slotted cylindrical part 7. The lower portion of the disc is a thick part circle 13 and the top surface constitutes cam-surface 20.

FIG. 4 shows locking element 9. For the purpose of cooperating within the diameter of partly circular disc 5 and the internal periphery of teeth 3 in the locking ring 2, locking element 9 takes the form on one side of an arc, i.e. it has an external surface of curvature 14. On one end of the element 9, a projection 9k carries the engagement tooth in the form of lock-stop 9g. Stationary stop 9h is located at the opposite end.

Locking element 9 can move freely in its plane on the surface of cam-surface 20 of partly circular disc 5 without any rotational mounting.

FIG. 5 shows the disc-shaped inertia element 10, made in the form of a flywheel, with pin 15 designed to engage in recess 22 in locking element 9. Located on the side of inertia disc 10 remote from projection 15 is a small pin-like lug 16, and located about 120° away from this lug 16, is a slot 17 positioned between two small ridges.

FIG. 6 is a perspective view of a spring 8 having a a projecting portion 8', and a terminal loop 8". In assembled condition, this loop is engaged with lug 16.

FIG. 7 is a perspective view of locking wheel 11 which is coupled to inertia element 10, through spring 8 by friction or torque.

FIG. 8 is a perspective view of an annular retainer 12 having each side thereof provided with adjusting cylinders 18 containing small inertia elements or sensors in the form of balls 19.

The configuration of locking element 9 is shown in FIG. 4. Such locking element 9 has an outer surface 14, which is interrupted in the middle, at the centre of gravity of locking element 9, by recess 22 located on the side opposing the cam-follower surface 9f, shown in this embodiment to be linear. As seen in the direction of rotation, lock-stop 9g is located on locking element 9 behind projection 9k, while locking surface 9l is arranged on the same end of the locking element. Located at the front end of locking element 9 is a projecting lug 9i, the front surface of which constitutes stationary stop 9h while the rear surface forms auxiliary lock-stop 9m.

Figure 12:
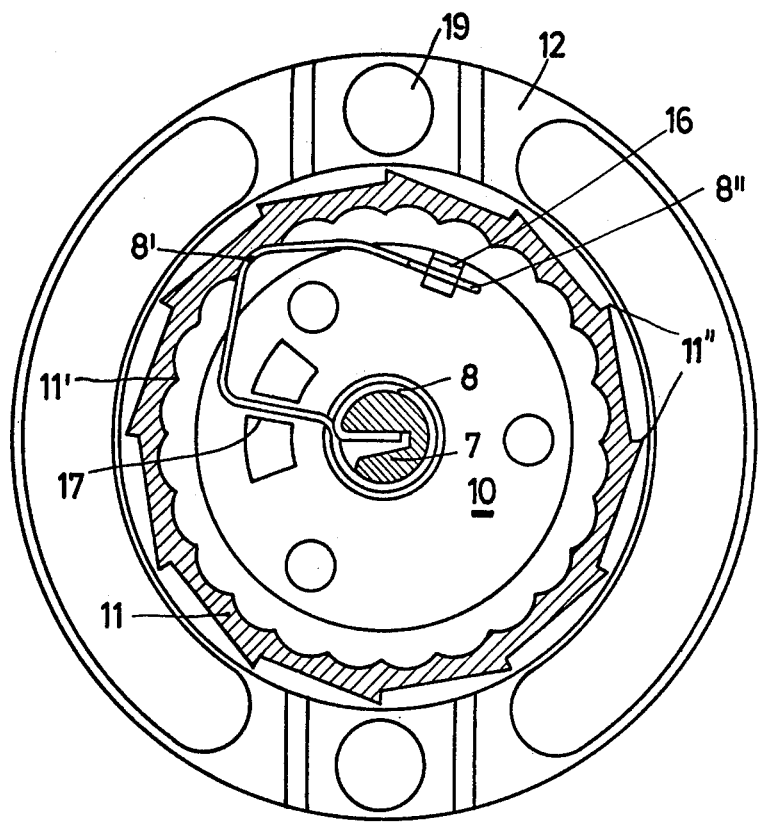
FIG. 12 shows another sectional view showing the projection spring portion.

Spring 8 is shown in FIGS. 6 and 12. One end of this spring lies in the slot in cylindrical part 7 on shaft 4, and the spring is spirally wound around part 7 until the other end passes through slot 17 in inertia element 10 and is bent twice through about 90° to form spring portion 8' with loop 8" at the extreme end being fitted to lug 16 of inertia element 10.

In FIG. 12, spring angle 8' is shown to be resiliently interlocked or "ratcheted" between internal teeth 11' of locking wheel 11 which also has external teeth.

When the device is assembled, annular retainer 12 is slipped over locking wheel 11 so that sensors 19 are located opposite teeth 11".

A stationary retainer, formed by inertia element 10 and projection 15, is rotatable about the axis of each of shaft 4 and of partly circular disc 5. Such stationary retainer is radially immovable, having a constant length and radius.

When the device is assembled, locking element 9 slides on annular surface 20 within locking ring 2. A thin disc of synthetic material may be provided to reduce friction or eliminate metal-to-metal contact.

In operation, the device works in two ways:

1. Locking action as a result of belt acceleration when extended.

The locking action is produced in this case by an acceleration value adjustable by the strength of spring 8. Inertia disc 10, which is preloaded by friction and spring 8, no longer rotates at the same velocity as partly circular disc 5, but lags behind. As a result, locking element 9 is moved by projection 15 in recess 22 towards the right as seen in FIGS. 1 and 3 to 5. Cam-follower surface 9f slides on cam surface 20 on the partly circular disc, so that lock stop 9g executes a small movement in a direction opposite to the direction of rotation of the shaft. This allows enough time for the projection 9k to move into the recess of tooth 3 for enough for locking surface 9l to bear on the base of the tooth 3. At the same time, auxiliary lock-stop 9m comes to rest against the cooperating locking surface in recess 23 in cam-surface 20. This is the moment at which the locked position is reached, i.e. the rotational force of shaft 4 is transferred via cam-surface 20, cam-follower surface 9f, and lock-stop 9g to locking ring 2.

When the belt is released, spring 8 moves inertia element 10 and locking element 9 into their neutral positions. This sliding proceeds along the chord direction until stationary stop 9h on lug 9i comes to rest on supporting surface 24 of recess 23.

2. Locking action controlled by the movement of the vehicle such as that movement arising from an impact, collision or roll-over.

The locking action in this instance is produced by sensors 19 in annular retainer 12 moving out of cylinders 18 and inwardly towards external teeth 11" on locking wheel 11 which is preferably made of synthetic material. This arrests locking wheel 11 which then halts inertia element 10 through the coupling action of spring portion 8' through slot 17. By means of projection 15 and recess 22, the inertia element moves the locking element into the locked position as described earlier. The distance travelled here is short and the locking action is practically instantaneous. Force now acts from stationary locking element 9, via inertia element 10, back to locking wheel 11, the external teeth 11' of which could now be sheared off by engagement with sensor 19 were it not for the resilient reverse bending of spring portion 8' which allows a jump to the next gap between the teeth. Accordingly, the locking wheel 11 continues to "ratchet" around in relation to the now stationary inertia disc 10. This has no effect, however, on the desired locking action of the belt-retractor.

Other embodiments may obviously be seen within the spirit of the invention as claimed. For example, the spring 8 may assume various shapes and still retain the advantages of the invention.

The embodiments of the invention in which an exclusive property or privilege is claimed are defined as follows:

1. A retractor for safety belts, having a housing, a locking ring containing internal teeth and being fixed relative to said housing, a shaft rotatably mounted about an axis for retracting an extensible belt, an inertia element rotatably mounted on said shaft and adapted to lag in rotation relative to said shaft upon a predetermined acceleration thereof, a locking element slidably movable in a plane perpendicular to said axis of said shaft, said inertia element having means for moving said locking element relative to said axis in response to said predetermined angular acceleration of said shaft to effect locking engagement between said locking element and said locking ring, said shaft being provided with a partly circular disc having a chord that comprises a linear cam surface, and said locking element comprising an internal linear cam-follower surface in sliding engagement with said linear cam surface, said inertia element being in engagement with said locking element to hold said locking element at a constant distance from said axis, whereby said locking element moves in a direction opposite to the direction of rotation of said shaft upon predetermined shaft acceleration to produce locked engagement with said locking ring.

2. A retractor according to claim 1 wherein said locking element is provided with a recess, said inertia element has a projection connected to said locking element, said projection being disposed in said recess of said locking element in engagement therewith, and said inertia element is preloaded in relation to said shaft by a spring means which connects said inertia element to said shaft.

3. A retractor according to claim 1 wherein said locking element has a projection on one end thereof, said projection of said locking element having a lock-stop connected to its rear side, the other end of said locking element having a lug connected thereto, said partly circular disc includes a recess in said linear cam surface and said lug cooperates with said recess to limit sliding movement of said locking element.

4. A retractor according to claim 3 wherein said lug comprises an auxiliary stop located on rear side thereof and a stationary stop located on a front side of said lug.

5. A retractor according to claim 3 wherein said locking element has a locking surface located adjacent said lock-stop, said internal teeth are provided with flanks disposed at an angle to said locking ring, and said locking surface and said lock-stop are disposed at substantially the same angle to said locking ring as the angle between the flanks of said internal teeth and said locking ring.

6. A retractor according to claim 2 wherein said recess in said locking element is located at the centre of gravity thereof.

7. A retractor according to claim 1 wherein said inertia element is a flywheel, said retractor includes an annular locking wheel mounted for rotation about said shaft and having internal and external teeth, said spring is additionally connected to said locking wheel, a portion of said spring being adapted to engage said internal teeth of said locking wheel, and said retractor further including sensor means adapted for movement into engagement with said external teeth of said locking wheel upon sudden deceleration of the vehicle to stop rotation of said locking wheel, whereby said spring causes said inertia element to move said locking element into locking engagement with said internal teeth of said locking ring.

8. A retractor according to claim 7 wherein said locking wheel is composed of synthetic material.

* * * * *